United States Patent
Prasad

(10) Patent No.: US 12,224,840 B2
(45) Date of Patent: Feb. 11, 2025

(54) DELIVERING AND HANDLING MEDIA CONTENT IN A WIRELESS COMMUNICATION NETWORK

(71) Applicant: Nokia Technologies Oy, Espoo (FI)

(72) Inventor: Athul Prasad, Naperville, IL (US)

(73) Assignee: NOKIA TECHNOLOGIES OY, Espoo (FI)

(*) Notice: Subject to any disclaimer, the term of this patent is extended or adjusted under 35 U.S.C. 154(b) by 445 days.

(21) Appl. No.: 17/284,165

(22) PCT Filed: Oct. 16, 2018

(86) PCT No.: PCT/FI2018/050752
§ 371 (c)(1),
(2) Date: Apr. 9, 2021

(87) PCT Pub. No.: WO2020/079320
PCT Pub. Date: Apr. 23, 2020

(65) Prior Publication Data
US 2021/0336684 A1 Oct. 28, 2021

(51) Int. Cl.
H04B 7/06 (2006.01)
H04B 17/318 (2015.01)
H04N 21/2343 (2011.01)
H04W 4/06 (2009.01)

(52) U.S. Cl.
CPC ......... *H04B 7/0695* (2013.01); *H04B 7/0632* (2013.01); *H04B 17/318* (2015.01); *H04N 21/2343* (2013.01); *H04W 4/06* (2013.01)

(58) Field of Classification Search
None
See application file for complete search history.

(56) References Cited

U.S. PATENT DOCUMENTS

| | | |
|---|---|---|
| 5,714,997 A | 2/1998 | Anderson |
| 7,023,825 B1 | 4/2006 | Haumont et al. |
| 8,649,383 B1 | 2/2014 | Narasimhan et al. |
| 9,253,592 B1 | 2/2016 | Moscovich et al. |
| 2005/0080900 A1 | 4/2005 | Culbertson et al. |

(Continued)

FOREIGN PATENT DOCUMENTS

| | | |
|---|---|---|
| CN | 108243302 A | 7/2018 |
| EP | 1692863 A1 | 8/2006 |

(Continued)

OTHER PUBLICATIONS

Office action received for corresponding Indian Patent Application No. 202147020849, dated Jun. 7, 2022, 7 pages.

(Continued)

*Primary Examiner* — Eunsook Choi
(74) *Attorney, Agent, or Firm* — ALSTON & BIRD LLP

(57) ABSTRACT

According to an example aspect of the present invention, there is provided an apparatus comprising means for receiving from a network node a transmission using a set of beams, wherein the transmission comprises at least directional media content, estimating a viewing direction based at least partially on directional properties of at least one beam of the set of beams, selecting a tile of the directional media content based on the estimated viewing direction and displaying the tile of the directional media content on a mobile device.

20 Claims, 9 Drawing Sheets

(56) References Cited

U.S. PATENT DOCUMENTS

| | | | |
|---|---|---|---|
| 2015/0206349 | A1 | 7/2015 | Rosenthal et al. |
| 2015/0349863 | A1 | 12/2015 | El Ayach et al. |
| 2016/0098860 | A1 | 4/2016 | Basra |
| 2016/0248995 | A1 | 8/2016 | Mullins et al. |
| 2016/0313963 | A1 | 10/2016 | Kang et al. |
| 2016/0366454 | A1 | 12/2016 | Tatourian et al. |
| 2017/0195044 | A1 | 7/2017 | Shatz et al. |
| 2017/0303263 | A1 | 10/2017 | Islam et al. |
| 2018/0182486 | A1 | 6/2018 | Miura et al. |
| 2018/0239419 | A1 | 8/2018 | Oh et al. |
| 2018/0374127 | A1* | 12/2018 | Walden .............. G06Q 30/0242 |
| 2021/0302756 | A1* | 9/2021 | Makinen ................ G02B 30/31 |

FOREIGN PATENT DOCUMENTS

| | | |
|---|---|---|
| WO | 2005/057913 A1 | 6/2005 |
| WO | 2018/035209 A1 | 2/2018 |
| WO | 2018/082904 A1 | 5/2018 |
| WO | 2019/048733 A1 | 3/2019 |

OTHER PUBLICATIONS

Extended European Search Report received for corresponding European Patent Application No. 18937200.6, dated Jun. 21, 2022, 15 pages.

Bondarenko et al., "Ultra-Low Delay for All: Live Experience, Live Analysis", Proceedings of the 7th International Conference on Multimedia Systems, 2016, 4 pages.

"TV in 2020: 50 Percent of Viewing will be Mobile", Ericsson, Retrieved on Apr. 9, 2021, Webpage available at : https://www.ericsson.com/en/press-releases/2017/10/tv-in-2020-50-percent-of-viewing-will-be-mobile.

"5G—Pre Trial—Frame Structure", ShareTechnote, Retrieved on Apr. 9, 2021, Webpage available at : http://www.sharetechnote.com/html/5G/5G_PreTrial_FrameStructure.html#BRS.

Ahmadi et al., "Adaptive Multicast Streaming of Virtual Reality Content to Mobile Users", Thematic Workshops '17: Proceedings of the on Thematic Workshops of ACM Multimedia, Oct. 23-27, 2017, pp. 170-178.

Elbamby et al., "Towards Low-latency and Ultra-Reliable Virtual Reality", arXiv, Jan. 23, 2018, pp. 1-8.

International Search Report and Written Opinion received for corresponding Patent Cooperation Treaty Application No. PCT/FI2018/050752, dated Feb. 14, 2019, 15 pages.

Extended European Search Report for European Application No. 18937200.6 dated Jun. 21, 2022, 14 pages.

First Examination Report for Indian Application No. 202147020849 dated Jun. 7, 2022, 8 pages.

Office Action for Chinese Application No. 201880100230.1 dated Oct. 28, 2023, 10 pages.

Office Action for Chinese Application No. 201880100230.1 dated Apr. 19, 2024, 10 pages.

Hearing Notice for Indian Application No. 202147020849 dated May 2, 2024, 2 pages.

Office Action for Chinese Application No. 201880100230.1 dated Aug. 8, 2024, 10 pages.

Office Action for European Application No. 18937200.6 dated Nov. 13, 2024, 10 pages.

* cited by examiner

DELIVERING AND HANDLING MEDIA CONTENT IN A WIRELESS COMMUNICATION NETWORK

RELATED APPLICATION

This application claims priority to PCT Application No. PCT/FI2018/050752, filed on Oct. 16, 2018, which is incorporated herein by reference in its entirety.

FIELD

Various example embodiments relate in general to wireless communication networks, and delivering and handling of media content in such networks.

BACKGROUND

Certain applications, such as, Virtual Reality, VR, may require high data rates for delivering media content, such as, for example, video content. In general, higher frequency bands have more bandwidth available for wireless transmissions, which enables higher data rates. Consequently, current standardization efforts in the field of radio communications comprise the exploitation of higher frequency bands for wireless transmissions. For example, 3rd Generation Partnership Project, 3GPP, develops 5G technology and considers the use of millimetre-wave frequency bands for it. There is therefore a need to provide improved methods, apparatuses and computer programs for transmitting and handling of media content, especially on high frequency bands.

SUMMARY

According to some aspects, there is provided the subject-matter of the independent claims. Some embodiments are defined in the dependent claims.

According to a first aspect, there is provided an apparatus comprising means for receiving from a network node a transmission using a set of beams, wherein the transmission comprises at least directional media content, estimating a viewing direction based at least partially on directional properties of at least one beam of the set of beams, selecting a tile of the directional media content based on the estimated viewing direction and displaying the tile of the directional media content on a mobile device.

According to the first aspect, the means may be further configured to perform transmission as a broadcast transmission or a multicast transmission.

According to the first aspect, the means may be further configured to perform selecting at least one strongest beam from the set of beams and selecting the tile of the directional media content based on the selected at least strongest one beam.

According to the first aspect, the means may be further configured to perform selecting a set of strongest beams from the set of beams and selecting the tile of the directional media content based on the selected set of strongest beams.

According to the first aspect, the means may be further configured to perform receiving information about the at least one beam, wherein said information comprises an identity of the at least one beam and selecting the tile of the directional media content based on the identity of the at least one beam.

According to the first aspect, the means may be further configured to perform receiving mapping instructions from the network node, wherein the mapping instructions comprise mappings between beam combinations and tiles of the directional media content, selecting a part of the mapping instructions based on a combination of received beams and selecting the tile of the directional media content based on the selected part of the mapping instructions.

According to the first aspect, the means may be further configured to perform determining an angle of arrival of the at least one beam and selecting the tile of the directional media content based on the angle of arrival of the at least one beam.

According to the first aspect, the means may be further configured to perform determining the angle of arrival of the at least one beam based on a direction tag associated with the at least one beam and a location tag of the network node.

According to the first aspect, the means may be further configured to perform receiving information about a location of the network node, determining a direction of the at least one beam based on the location of the network node and selecting the tile of the directional media content based on the direction of the at least one beam.

According to the first aspect, the means may be further configured to perform rendering the tile of the directional media content for the user.

According to the first aspect, the means may be further configured to perform signalling information about the at least one beam and/or the estimated viewing direction of the user from a physical layer of the mobile device to an application layer and selecting, at the application layer, the tile of the directional media content based on the signalled information.

According to the first aspect, the set of beams may comprise beams in horizontal and vertical directions.

According to the first aspect, the means may be further configured to perform receiving information related to multiple streams or programs via the at least one beam, selecting one of said multiple streams or programs and displaying the selected stream or program on the display of the mobile device.

According to a second aspect, there is provided an apparatus comprising means for transmitting a transmission using a set of beams, wherein the transmission comprises at least directional media content and transmitting information for displaying a tile of the directional media content on a mobile device.

According to the second aspect, the means may be further configured to perform transmission as a broadcast transmission or a multicast transmission.

According to the second aspect, said information may comprise information related to the set of beams.

According to the second aspect, said information may comprise mapping instructions, and the mapping instructions may comprise mappings between beam combinations and tiles of the directional media content.

According to the second aspect, said information may comprise an identity of a beam.

According to the second aspect, said information may comprise a location of the network node.

According to the second aspect, said information may comprise the set of beams may comprise beams in horizontal and vertical directions.

According to the second aspect, the means may be further configured to perform transmitting information related to multiple streams or programs via each beam of the set of beams.

According to a third aspect, there is provided an apparatus comprising at least one processing core, at least one memory including computer program code, the at least one memory and the computer program code being configured to, with the at least one processing core, cause the apparatus at least to perform, receive from a network node a transmission using a set of beams, wherein the transmission comprises at least directional media content, estimate a viewing direction based at least partially on directional properties of at least one beam of the set of beams, select a tile of the directional media content based on the estimated viewing direction and display the tile of the directional media content on a mobile device.

According to a fourth aspect, there is provided an apparatus comprising at least one processing core, at least one memory including computer program code, the at least one memory and the computer program code being configured to, with the at least one processing core, cause the apparatus at least to perform, transmit a transmission using a set of beams, wherein the transmission comprises at least directional media content, and transmit information for displaying a tile of the directional media content on a mobile device.

According to a fifth aspect, there is provided a method comprising receiving from a network node a transmission using a set of beams, wherein the transmission comprises at least directional media content, estimating a viewing direction based at least partially on directional properties of at least one beam of the set of beams, selecting a tile of the directional media content based on the estimated viewing direction and displaying the tile of the directional media content on a mobile device.

According to a sixth aspect, there is provided a method comprising transmitting a transmission using a set of beams, wherein the transmission comprises at least directional media content, and transmitting information for displaying a tile of the directional media content on a mobile device.

According to a seventh aspect, there is provided a non-transitory computer readable medium having stored thereon a set of computer readable instructions that, when executed by at least one processor, cause an apparatus to at least perform, receiving from a network node a transmission using a set of beams, wherein the transmission comprises at least directional media content, estimating a viewing direction based at least partially on directional properties of at least one beam of the set of beams, selecting a tile of the directional media content based on the estimated viewing direction and displaying the tile of the directional media content on a mobile device.

According to an eighth aspect, there is provided a non-transitory computer readable medium having stored thereon a set of computer readable instructions that, when executed by at least one processor, cause an apparatus to at least perform, transmitting a transmission using a set of beams, wherein the transmission comprises at least directional media content, and transmitting information for displaying a tile of the directional media content on a mobile device.

According a ninth aspect, there is provided a computer program configured to perform, receiving from a network node a transmission using a set of beams, wherein the transmission comprises at least directional media content, estimating a viewing direction based at least partially on directional properties of at least one beam of the set of beams, selecting a tile of the directional media content based on the estimated viewing direction and displaying the tile of the directional media content on a mobile device.

According to a tenth aspect, there is provided a computer program configured to perform, transmitting a transmission using a set of beams, wherein the transmission comprises at least directional media content, and transmitting information for displaying a tile of the directional media content on a mobile device.

EMBODIMENTS

Figure 1:
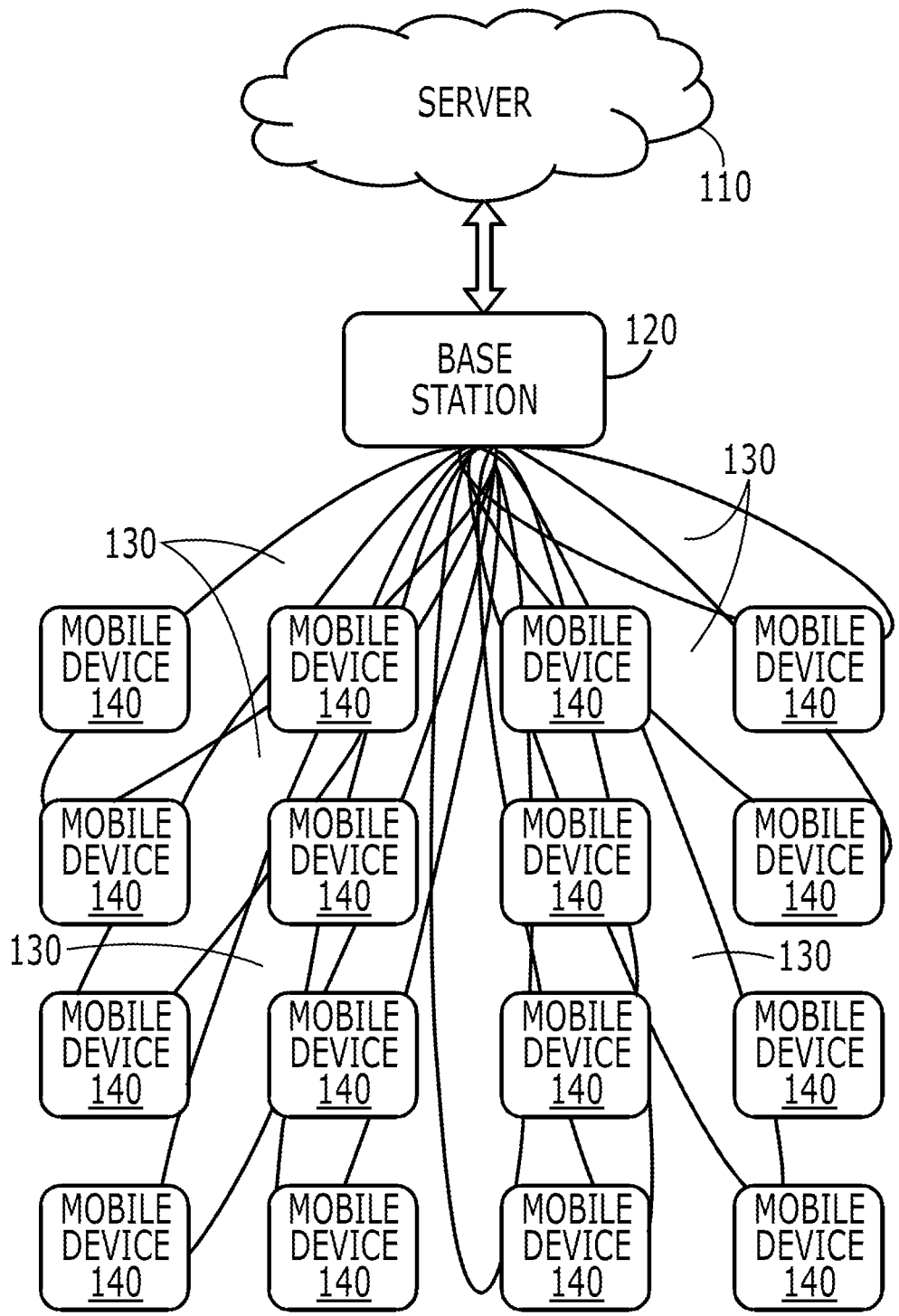
FIG. 1 illustrates an exemplary network scenario in accordance with at least some embodiments.

Transmission and handling of media content, such as, for example, video content, may be improved by the procedures described herein. In more detail, a network node may transmit a transmission using a set of beams, wherein the transmission comprises directional media content. In general, beams may be used for highly directional radio transmissions, which may be used to transmit data from a transmitter, e.g., a base station, to a receiver, e.g., a mobile device. Upon reception of the transmission, the mobile device may select a strongest beam, or beams, and estimate a viewing direction of a user of the mobile device based on a direction of the selected beam(s). The viewing direction of the user may correspond to a direction to which the mobile device is directed to. The mobile device may also select a tile of the media content based on a direction of the selected beam(s) and display the selected tile on a display of the mobile device. Media content may be, for example, directional media content.

More specifically, some embodiments relate to delivering and handling of high-quality directional media content for applications, such as, Virtual Reality, VR, and/or Augmented Reality, AR. Such applications typically deliver 3D video content and require high data rates. For example, data rates of at least 1 Gbps may be required, depending on the quality of the media content. In the context of 5G the requirement may be fulfilled by exploiting enhanced Mobile BroadBand, eMBB type of communication. Moreover, such applications also require low latencies and small jitter. In general, it is desirable to utilize wireless transmission, e.g., multicast or broadcast transmissions, for the delivery of such media content, because delivering the content using unicast transmissions may be impractical.

Multicast transmissions may be used if the same directional media content is addressed to a selected group of users, whereas broadcast transmissions may be used if the content needs to be sent to all the users. In some embodiments, said media content may refer to directional media content, such as, for example, 3D, VR, AR, 360-degree videos or any form of media content with directional properties. That is to say, media shown to the user may depend or vary based on the viewing direction of the user.

High data rates may be achieved using high frequency bands, because typically there is more bandwidth available on higher frequency bands. For example, frequency bands between 30 and 300 GHz may be used. Such frequency bands may be referred to as millimetre-wave bands. Future radio communication systems may use even higher frequency bands. Beamforming is often, if not always, used on millimetre-wave bands to improve the performance of wireless communication systems. Embodiments may exploit beamforming for delivering high-quality media content, but are not restricted to any particular radio access technology, or frequency band, and may be exploited in any wireless communication system, wherein beamforming is used.

In some embodiments, a 3D grid of beams may be used for delivering directional media content. In general, a 3D grid of beams may comprise directional beams which are spatially separated in a 3D space. 3D properties may comprise a beamwidth along with a vertical and horizontal direction of a beam. By vertical it is meant in a direction perpendicular to the plane of the horizon. The grid, or a set, of beams would be thus three-dimensional. Moreover, a 3D grid of beams may be used to deliver any form of data, including 3D media content.

FIG. 1 illustrates an exemplary network scenario in accordance with at least some embodiments. According to the example scenario of FIG. 1, there may be a beam-based wireless communication system, which comprises server 110, base station 120, beams 130 and mobile devices 140. Server 110 may be a low-latency edge cloud/content server. FIG. 1 shows beams 130 horizontally for clarity. Nevertheless, a set of beams 130 may also comprise beams in a vertical direction, thereby forming a 3D grid, or set, of beams 130.

Mobile devices 140 may comprise, for example, an User Equipment, UE, a smartphone, a cellular phone, a Machine-to-Machine, M2M, node, machine-type communications node, an Internet of Things, IoT, node, a car telemetry unit, a laptop computer, a tablet computer, wireless head mounted device, or, indeed, another kind of suitable wireless device or mobile device. In the example system of FIG. 1, mobile devices 140 communicate wirelessly with a cell of Base Station, BS, 120 via beams 130. BS 120 may be considered as a serving BS for mobile devices 140. Air interface between mobile device 140 and BS 120 may be configured in accordance with a Radio Access Technology, RAT, which both mobile device 140 and base station 120 are configured to support.

Examples of cellular RATs include Long Term Evolution, LTE, New Radio, NR, which is also known as fifth generation, 5G, radio access technology and MulteFire. On the other hand, examples of non-cellular RATs include Wireless Local Area Network, WLAN, and Worldwide Interoperability for Microwave Access, WiMAX. For example, in the context of LTE, BS 140 may be referred to as eNB while in the context of NR, BS 120 may be referred to as gNB. Also, for example in the context of WLAN, BS 120 may be referred to as an access point. In general, BS 120 may be referred to as a network node. Mobile devices 140 may be similarly referred to as UEs. In any case, embodiments are not restricted to any particular wireless technology, and may be exploited in any system which uses beamforming for wireless transmissions.

BS 120 may be connected, directly or via at least one intermediate node, with core network 110. Core network 110 may be, in turn, coupled with another network (not shown in FIG. 1), via which connectivity to further networks may be obtained, for example via a worldwide interconnection network. BS 120 may be connected with at least one other BS as well via an inter-base station interface (not shown in FIG. 1), even though in some embodiments the inter-base station interface may be absent. BS 120 may be connected, directly or via at least one intermediate node, with core network 110 or with another core network.

FIG. 1 shows mobile devices 140 configured to be in a wireless connection on one or more communication channels in a cell with a BS 120 (such as (e/g) NodeB providing the cell). The physical link from mobile device 140 to a BS 120 is called uplink or reverse link and the physical link from BS 120 to mobile device 140 is called downlink or forward link. It should be appreciated that BS 120 or its functionalities may be implemented by using any node, host, server or access point, etc., entity suitable for such a usage. The current architecture in LTE networks is fully distributed in the radio and fully centralized in the core network. However, the low latency applications and services in 5G require bringing the content close to the radio which leads to local break out and Multi-access Edge Computing, MEC. 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content, host application instances, etc., in close proximity to cellular subscribers for faster response time. 5G (or NR) networks are being designed to support multiple hierarchies, where MEC servers can be placed between the core and BS 120. It should be appreciated that MEC can be applied in LTE networks as well.

Beam-based wireless communication systems enable efficient transmission of media content to multiple mobile devices 140 using multicast and/or broadcast transmissions. As an example, the scenario of FIG. 1 may be considered as an indoor viewing arena, wherein BS 140 may transmit media content and mobile devices 140 may receive the media content via beams 130. Tailored sub-content may be transmitted to different mobile devices 140 as well, e.g., for censoring a part of the content for adult and under-age viewers, for delivering tailored advertisements and subtitles in different languages, etc. Tailored sub-content may be transmitted using unicast along with multicast and/or broadcast transmission.

In some embodiments, wireless communications may be exploited instead of wired communications due to the inherent robustness and flexibility that wireless solutions provide. For example, deployment of VR devices using wired connections in movie theatres or stadiums would make the system susceptible to wear and tear, and possible loss of connectivity due to wire damages. Furthermore, mobile devices may be built in a robust manner, with automated tests conducted to ensure that the mobile devices are performing well. Development of a new ecosystem through industry verticals may be enabled as well, using generic deployments. Concerning mobility, for example in indoor deployments limited mobility is typically allowed and may be tolerated without noticeable loss of quality, such as, standing up and slight adjustments for comfort, etc. However, service interruptions or loss of quality may occur if mobile device 140 moves significantly from the assigned location.

One challenge related to ubiquitous availability and technology adoption of media content, such as VR, is the availability of low-cost mobile devices which could be exploited to deliver such content to the users. Generally speaking, consumers tend to prefer cheaper or low-cost equipment for consuming immersive and directional audio-visual, i.e., media, content. However, currently available VR headsets are expensive compared to regular mobile devices, because additional components are needed for enabling seamless visibility of directional content. In general, directional content may refer to media content, such as video or audio, which has location or directional relevance. For example, virtual and augmented reality content may be considered as directional content, where the viewed content needs to be adjusted based on the location and viewing direction of a user.

Moreover, a viewing direction of the user may refer to a direction the user is looking at or to a direction the mobile device is directed to. For instance, in case of 3D media content the viewing direction of the user may refer to the direction the user is looking at in 3D space, i.e., a tile of the 3D viewing space. Thus, the mobile device would be directed to the tile of the 3D viewing space as well. The media content may be provided as a plurality of tiles, wherein each tile may correspond to a sub-stream of a stream, and the stream comprises the overall media content. The appropriate directional media content may be shown to the user depending on the viewing direction, i.e., the direction the mobile device is directed to. Thus, to change to another tile, users may simply turn their heads or viewing direction to change the direction the mobile device is directed towards. The direction may be estimated and the mobile device may fetch and show a tile to the user based on the estimated new viewing direction.

Total number of tiles may depend on an encoding technique used. In some embodiments, it may be assumed that entire directional media content may be quantized into an appropriate number of tiles. The quantization may also be based, e.g., on accuracy of direction estimation of the network. Accuracy of direction estimation may depend on a number of base station and available beams. In some embodiments, a mobile device may have additional antenna configurations to enable a beam-based system design, such as loops around the mobile device, both in uplink and downlink. The mobile device may therefore be reused as a VR headset without any additional equipment. Thus, the antenna configuration of the mobile device may be exploited to enable estimation of the viewing direction of the user.

In some embodiments, multiple antennas may be positioned in the mobile device depending on operational frequency bands, for accurate detection of beam and transmission parameters. As an example, a mobile device may comprise multiple antennas for reception of a beamformed transmission. Said multiple antennas may be at different locations within the mobile device or associated with the mobile device. The mobile device may receive, for example, a downlink transmission using said multiple antennas. As the antennas may be at different locations, different antennas may receive a beam at different arrival times. Thus, for example an arrival time of the beam may be determined separately for each antenna. An angle-of-arrival may then be determined based on the arrival times. Hence, the mobile device receiving the directional media content would be able to accurately determine the directional properties of the received beam.

Said multiple antennas associated with the mobile device may form an antenna array, which may be used for directional signal reception. For example, a conventional beamformer known as delay-and-sum beamformer may be formed. The conventional beamformer may give equal magnitudes for weights of the antennas and it may be steered to a certain direction by assigning proper phases for each antenna. A phase shifter may be used in association with each antenna for directional signal reception.

In some embodiments, a method for transmitting high-definition, high-data rate, directional media content using wireless communications is provided. One of the aims is to enable viewing of directional media content while minimizing complexity of mobile device implementation and avoiding additional, dedicated components. Some embodiments therefore provide a cost-efficient method for delivering media content. Moreover, the efficient delivery of directional media content is enabled.

Transmissions of a network node, such as BS 120, Transmit-Receive Point, TRP, distributed unit or remote radio head may have highly directional characteristics, which may be exploited by mobile devices, such as mobile devices 140, for estimating the viewing direction of the transmitted directional media content, i.e., the direction the mobile device is directed to. Source network node may transmit transmissions wirelessly to mobile devices, wherein the transmissions may comprise media content, e.g., VR content. The mobile device may be an end-user device, for example, a low-cost UE without directional measurement or estimation capabilities, and capable of displaying the content to the user with high-quality.

In some embodiments, transmissions may be performed by exploiting beamforming. The network node may transmit media content over all available beams together with a location tag. The location tag may be used for determining a location of the network node. For example, the location tag may comprise a relative location of the network node, compared to other network nodes. Thus, a direction of at least one beam may be estimated using the relative location of the network node and a location of the mobile device. Alternatively, or in addition, the mobile device may use the location of the network node and information related to beams, such as received powers, identities of the beams or beam reference information, to determine the direction of the at least one beam. The mobile device may then provide directional content, i.e., a tile, based on the determined direction of the at least one beam. That is to say, the mobile device may then provide directional content based on a determined direction to which the mobile device is directed to.

Also, in some embodiments the network node may transmit, i.e., broadcast or multicast, content using all available beams together with direction tags for each beam. One direction tag may comprise a direction of one beam and be used for providing directional content based on the direction of the beam, wherein the direction of the beam may correspond to a direction to which the mobile device is directed to. Direction tags may be used together with location tags.

Alternatively, or in addition, in some embodiments identities of the beams may be transmitted. Thus, if the direction of each beam has been mapped to the identity of each beam beforehand, received identity may be used for determining the direction of a beam and for providing directional content based on the determined direction of the beam.

Moreover, in some embodiments the target node may use an angle of arrival of at least one beam to generate directional information, which may be further used to provide the directional content. The angle of arrival may be used together with location tags, direction tags and/or beam identities as well. The mobile device may also select the directional content based on tile-based encoding, for example, by correlating the sub-streams within the transmitted 360-degree content with the viewing direction information. Sub-streams may indicate independent flows of traffic for each tile of the directional media content. Moreover, sub-streams may be isolated by the network, for example, using a dynamic adaptive streaming over Hypertext Transfer Protocol, HTTP, DASH-aware network element, DANE. Thus, each sub-stream may represent a tile which in turn represents a corresponding spatial display position.

Figure 2:
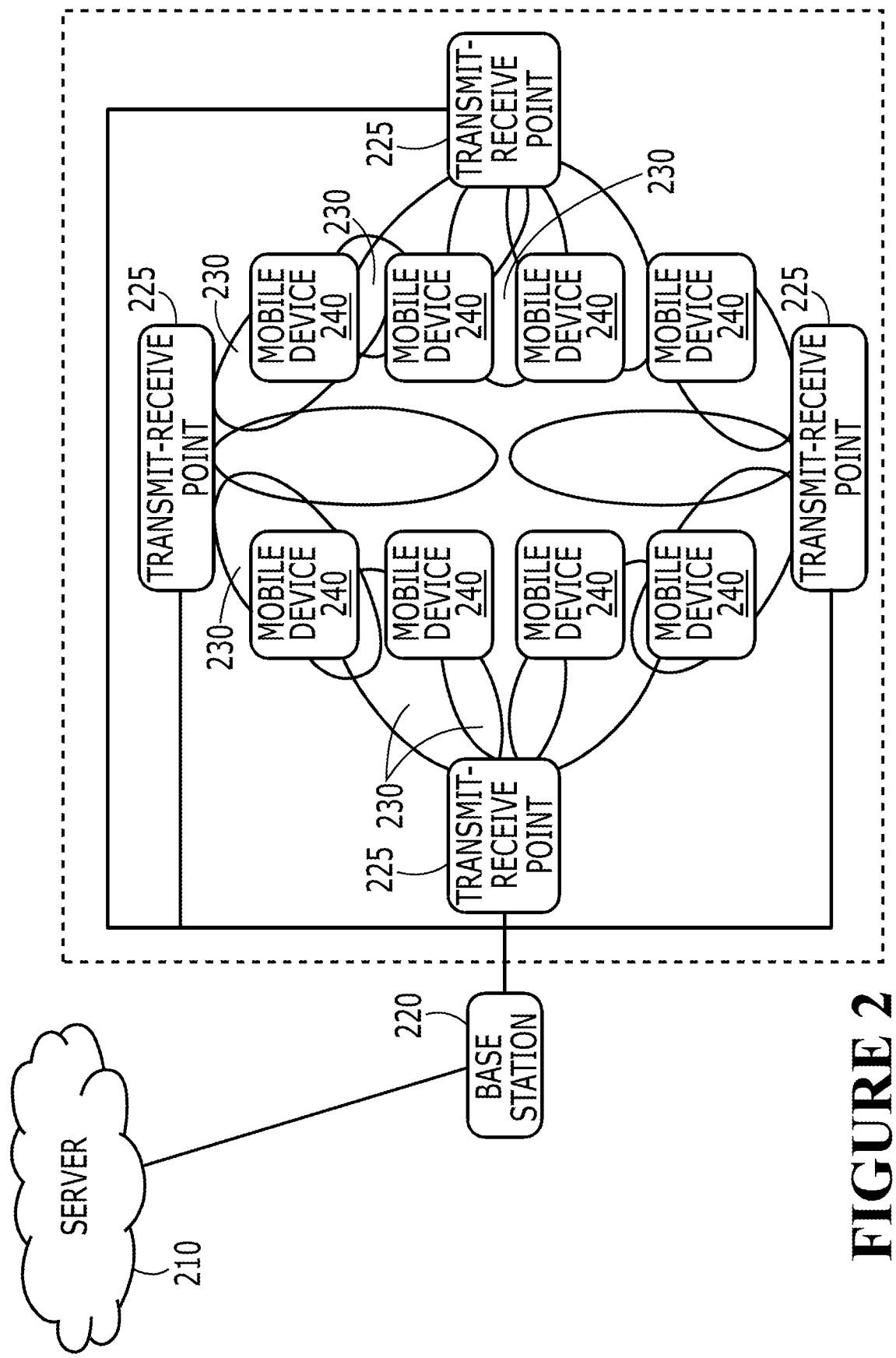
FIG. 2 illustrates an exemplary network scenario for transmitting directional content in accordance with at least some embodiments.

FIG. 2 illustrates an exemplary network scenario for transmitting directional media content in accordance with at least some embodiments. With reference to FIG. 1, server 210 may correspond to server 110, base station 220 may correspond to base station 120, beams 230 may correspond to beams 130 and mobile devices 240 may correspond to mobile devices 140. In addition, TRPs 225 are shown in FIG. 2. TRPs 225 may be connected to BS 220 via wired connections while TRPs 225 may use wireless communications for communicating with mobile devices 240 via beams 230. In some embodiments, multiple BSs 220 may be used instead of, or in addition to, TRPs 225.

TRPs 225 may transmit same media content over multiple beams 230. The transmissions over each beam may also comprise a location tag of TRP 225 in question. TRPs 225 may be referred to as source transmitters and the location tag of each TRP 225 may indicate to mobile devices 240 the relative position of each TRP 225. The location tag may be associated with an identity of TRP 225 for providing appropriate directional media content. In order to provide best viewing experience and coverage within the area, multiple TRPs 225 may be deployed within the coverage area.

Alternatively, or in addition, transmissions over each beam may comprise beam information, which is specific for a beam. The beam information may comprise, for example, a direction tag, i.e., direction of the beam. In some embodiments, each beam may be mapped to a certain tile of the content. Direction tag may be seen as an reference to tiled content information, i.e., a tile of a 3D viewing space, within the 3D viewing space of the directional media content. Hence, the transmission of the beam may comprise information identifying substantially one tile, or sub-stream, of the content to be shown to a user.

In some embodiments, the beam information may comprise an identity of the beam. Direction of the beam may be pre-determined and thus the identity of the beam may be used as a reference to a tile of a 3D viewing space.

In some embodiments, an application instance may be located at edge cloud/content server 210 and location or direction tagging may be performed by server 210. Concerning the application instance, an application server may be located at a remote server but in case of low-latency applications, such as VR, the application server associated with the application instance may be hosted/located at the edge cloud. An application client may then be in mobile devices 240, which may be used for viewing the directional media content.

Due to the directional characteristics of beams 230, mobile devices 240 may receive directional media content from a source network node and show the appropriate directional content to a user depending on the actual viewing direction. The actual viewing direction may correspond to a direction to which mobile device 240 is directed to. Mobile devices 240 may also determine a location of the source network node during the process. Due to highly directional properties of the transmissions on millimeter-wave bands, using beams 230, a viewing direction of a user associated with mobile device 240 may impact a candidate set of strongest beams received by mobile device 240. The viewing direction of the user may indicate the direction the user is looking at in the 3D space, because mobile device 240 may be directed to that direction. Hence, appropriate directional media content may be shown to the user based on estimated viewing direction of the user.

The candidate set of strongest beams may be similar to a neighbor cell list in legacy systems, e.g., LTE, wherein mobile devices 240 may maintain a list of strongest cells and, possibly, relatively weaker neighbor cells. In a beam-based system mobile devices 240 may also maintain information about a strongest set of beams that it receives at any point of time. Thus, mobile devices 240 may provide directional media content to a user, i.e., a tile, based on the strongest set of beams, because the strongest set of beams may indicate a direction to which mobile device 240 is directed to. So if, for example, a combined direction tag of all the strongest beams would be used, it would enable more accurate estimation of the viewing direction. At least in case of a multicast or broadcast with Single-Frequency Network, SFN, type of transmissions, mobile device 240 may receive the data from multiple beams. The transmitters, e.g., BSs or TRPs, may coordinate and synchronize data transmissions using same physical resource blocks, thereby improving the received signal quality at the mobile device. The mobile device may be able to identify the beams using metadata, as will be described later on.

Figure 3:
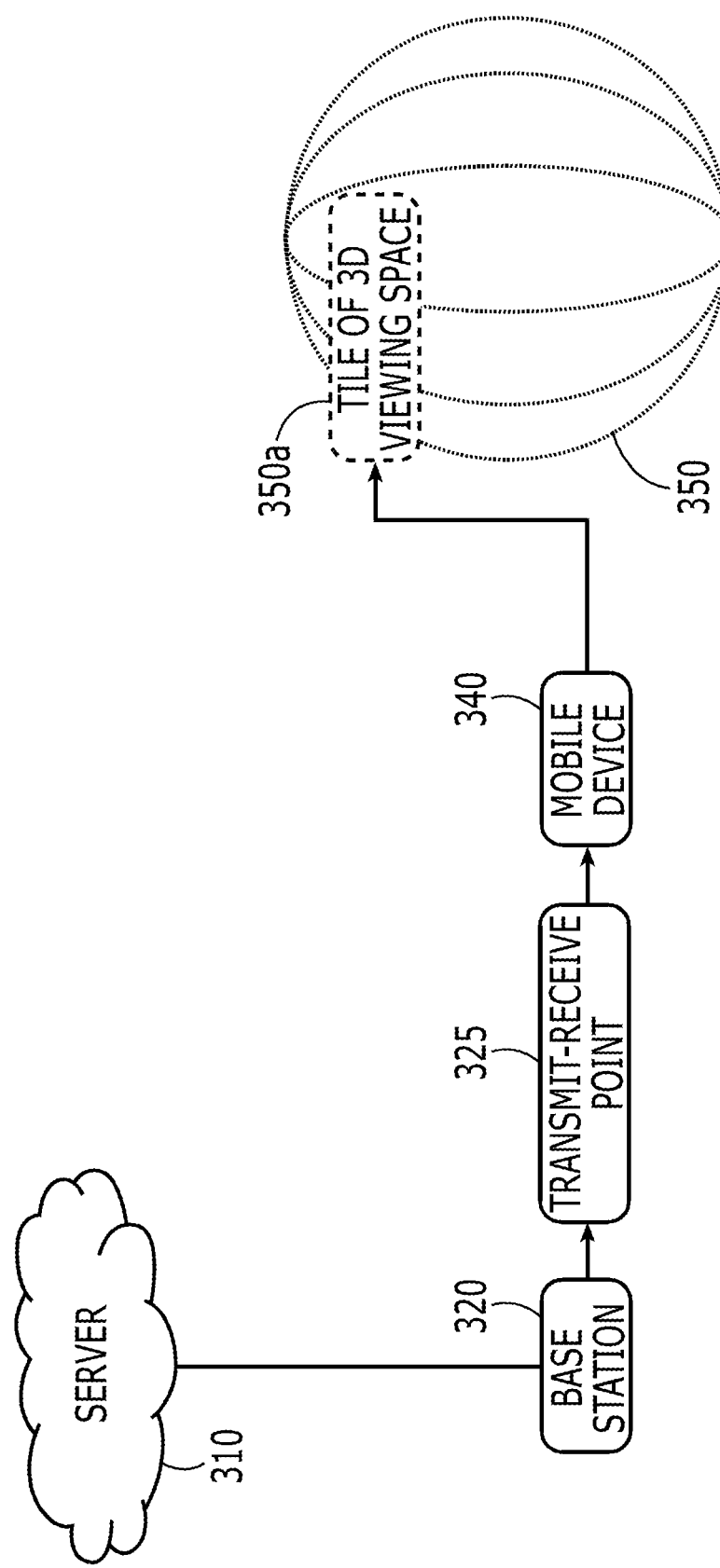
FIG. 3 illustrates an exemplary scenario in accordance with at least some embodiments.

FIG. 3 illustrates an exemplary scenario in accordance with at least some embodiments. With reference to FIG. 1, server 310 may correspond to server 110, BS 320 may correspond to BS 120, and mobile device 340 may correspond to mobile device 140. Also, with reference to FIG. 2, TRP 325 may correspond to TRP 225. In the example of FIG. 3, 3D viewing space 350 may comprise a tile 350a or part of tile 350a that is shown to a user. As an example, tile 350a may be presented on a display of a 3D VR headset. In some embodiments, tile 350a may be referred to as a part of 3D viewing space 350, which is related to directional media content and shown to the user. In general, 3D viewing space 350 may be referred to as media content. A user may view a part of the tile 350a as well, and for that level of accuracy a mobile device may either estimate a change in received beam angle-of-arrival accurately or use some other sensors within the mobile device (for e.g., gyroscope and accelerometer).

Server 310 or BS 320 may transmit location information related to TRP 325 and/or direction or identity information related to beams along with media content. Hence, UE 340 may receive a transmission using multiple beams from TRP 325. The transmission may comprise location information related to TRP 325, possibly along with direction and/or identity information related to beams and the media content. Mobile device 340 may, upon receiving said information, determine a direction of a beam. Consequently, mobile device 340 may determine tile 350a based on the direction of the beam. Alternatively, tile 350a may be determined based on an angle of arrival of said beam. Tile 350a may be related to a direction the user is looking at, i.e., tile 350a of 3D viewing space 350, and it may correspond to the direction of said one beam. Tile 350a may hence correspond to a direction to which mobile device 340 is directed to.

Tile 350a may be regenerated from the data sent over the beams. Consequently, mobile device 340 may provide tile 350a of 3D viewing space 350 to a user via a display. Hence, some embodiments enable mobile device 340, which may be capable of receiving beam-formed transmissions and attached to a 3D display, to provide and show directional media content to the user without any additional equipment within the mobile device or externally. For example, wireless head mounted devices used to view directional media content currently require external sensors and initial manual calibration to estimate the viewing direction of the user relative to the directional content being viewed. In some embodiments, directional properties of transmissions, e.g., 5G transmissions, may be combined to estimate the viewing direction of the user without any additional equipment or sensors.

Calibration may be done in the application layer of the mobile device with active intervention by a user. For example, the calibration may be performed by an application client installed in the mobile device for viewing the directional content. The application client may request the user to indicate manually when a particular direction is seen within the directional media content, which may then be used along with the beams as a reference point to correlate the directional media content and the received beams. Alternatively, the calibration may also be done by a multi-access edge cloud or a network, based on an indication of a user indicating that an incorrect viewing direction is shown by the mobile device or the application of mobile device detects incorrect viewing direction to activate update. The indication of the incorrect viewing direction may act as a trigger for updating mapping between the location and direction tags. Transmission of information related to these interactions may take place on the user plane.

Some embodiments may be applicable in a scenario, wherein there is only one BS 320 or TRP 325. Mobile device 340 may recreate the tile 350a or part of the 3D viewing space 350 using the received information, such as, relative location of TRP 325 which may be received together with the transmitted media content. Relative location of TRP 325 may be within the 3D space.

In addition, or alternatively, mobile device 340 may also use an angle of arrival of the received beams to recreate tile 350a of 3D viewing space 350. Mobile device 340 may have multiple antennas and hence the angle of arrival may be estimated accurately by using said multiple antennas. For example, if a user changes the viewing direction by moving the mobile device, e.g., by rotating his/her head in case of VR headsets, the angle of arrival of the received strongest set of beams would change, which may be used to provide appropriate directional media content to the user or VR headsets. Hence, location of provided tile 350a of 3D viewing space 350 would change on 3D viewing space 350.

The main difference with the scenario of FIG. 2 compared to FIG. 1 or FIG. 3 is that in case of multiple TRPs of FIG. 2 the set of strongest beams (possibly identified by beam IDs) may change as well. With multiple TRPs, the mobile device may use a TRP or a cell identity together with a beam identity to estimate the viewing direction, e.g., in combination with a direction tag. However, with a single TRP, there would be different sets of beams (e.g., with direction tags) from the same TRP to compute. Thus, the more information related to the direction tags the mobile device has, the higher would be the accuracy of the viewing direction.

For example, an increased amount of information would make it possible for the mobile device to estimate a change in viewing direction based on minor changes in received power levels of various beams and corresponding angle-of-arrival. Increased amount of information may also imply added information related to the different sets of received beams from the TRPs, depending on the change in viewing direction of the user. Hence, increased amount of information would enable mobile device 340 to make the directional estimation faster and more accurately. Mobile device 340 may then select the appropriate directional content from the received data and provide the appropriate directional content, i.e., tile 350a of 3D viewing space 350, to the user.

In some embodiments, all 3D media content 350 may be cached in a mobile device and then the content for tile 350a of 3D viewing space 350 may be selected based on received beams and/or estimated directionality, which may be calculated based on the strongest received beams and location of TRPs 325. Thus, there would be no need to transmit media content continuously. Therefore, complexity may be minimized at lower protocol levels of a mobile device while enabling selection of the appropriate content, i.e., tile 350a of 3D viewing space 350, at the application layer. The lower protocol levels may comprise, e.g., physical layer, and information about the strongest beams and/or estimated directionality may be transmitted from the physical layer to the application layer.

Location tagging may be done either statically or dynamically, depending on the scenario. For example, in an indoor viewing arena or a movie theatre location and direction tagging may be done statically because the directional media content may be stored for long. For example, the directional media content may be stored in an edge-cloud server close to the base station or TRP, or locally within a private network, e.g., 5G private network depending on the deployment scenario. Alternatively, location and direction tagging may be done dynamically. For example, in scenarios where live or non-live media content is transmitted over wider areas with the content cached at mobile devices and shown locally. So if a location of a mobile device does not change relative to the base station transmitters, location tagging may be done statically, i.e., there would be always the same tags for the same location, irrespective of the media content that is transmitted. For example, in a movie theatre locations of seats and locations of the BSs or TRPs may be the same irrespective of a movie that is played. On the other hand, tagging may be done dynamically, i.e., in a museum or outdoor locations, such as stadiums, concert grounds, etc. Beams, transmitted by BSs or TRPs, may come from different directions for different mobile devices 340 and hence, sets of strongest beams received from different TRPs 325 may be different as well. A set of strongest beams may be referred to as a candidate set of beams. That is to say, the set of strongest beams may depend at least partially on the viewing direction and location of each individual user. A mobile device may hence require either some form of calibration where a correlated direction may be periodically, or any other time, feedback to the network. The correlated direction may refer to a direction identified by the mobile device, i.e., the mobile device may identify that a certain beam, or a set of beams, corresponds to a certain tile of the directional media content and feedback the correlated direction to the network.

Calibration may also be done based on receiving a confirmation from a mobile device related to the estimated viewing direction. That is to say, the mobile device may confirm that a certain correlated direction is correct, i.e., a certain beam, or a set of beams, corresponds to a certain tile of the directional media content.

The confirmation may be received while setting up the directional media content. The network may transmit content for calibration while setting up the directional media content as well. The calibration content may be correlated with the direction tags based on user feedback to derive a correlated direction. The correlated direction may be estimated depending at least partially on the candidate beams and application level intelligence, for estimating the viewing direction based at least partially on the aggregated location tag information. Application layer intelligence may be used to fetch a tile of the directional media content and display the tile on the mobile device, based on the estimated viewing direction.

There may be no specific impacts to the connection setup procedure, since the data reception at the mobile device, or end-to-end application flow in the mobile device between the application client in the mobile device and the application server, may occur after a successful connection setup procedure and setup of bearers. A specific user feedback may be required to derive a correlated direction, similarly as in case of the calibration.

Furthermore, content may be divided into sub-streams, which may be transmitted separately. Hence, in some embodiments a tile or sub-stream and tile 350a of 3D viewing space 350 may be assumed to be the same. As an example, server 310 or BS 320 may split 3D viewing space 350 into a quantized set of tiles. In some embodiments, server 310 or BS 320 may use tile-based Dynamic Adaptive Streaming over Hypertext Transfer Protocol, DASH, sub-streams to deliver the content to mobile device 340. Wireless communications may be used to transmit 3D viewing space 350, comprising all the tiles, over air interface. Then, mobile device 340 may select and provide appropriate content from the received sub-streams based on the estimated viewing direction of a user.

Figure 4:
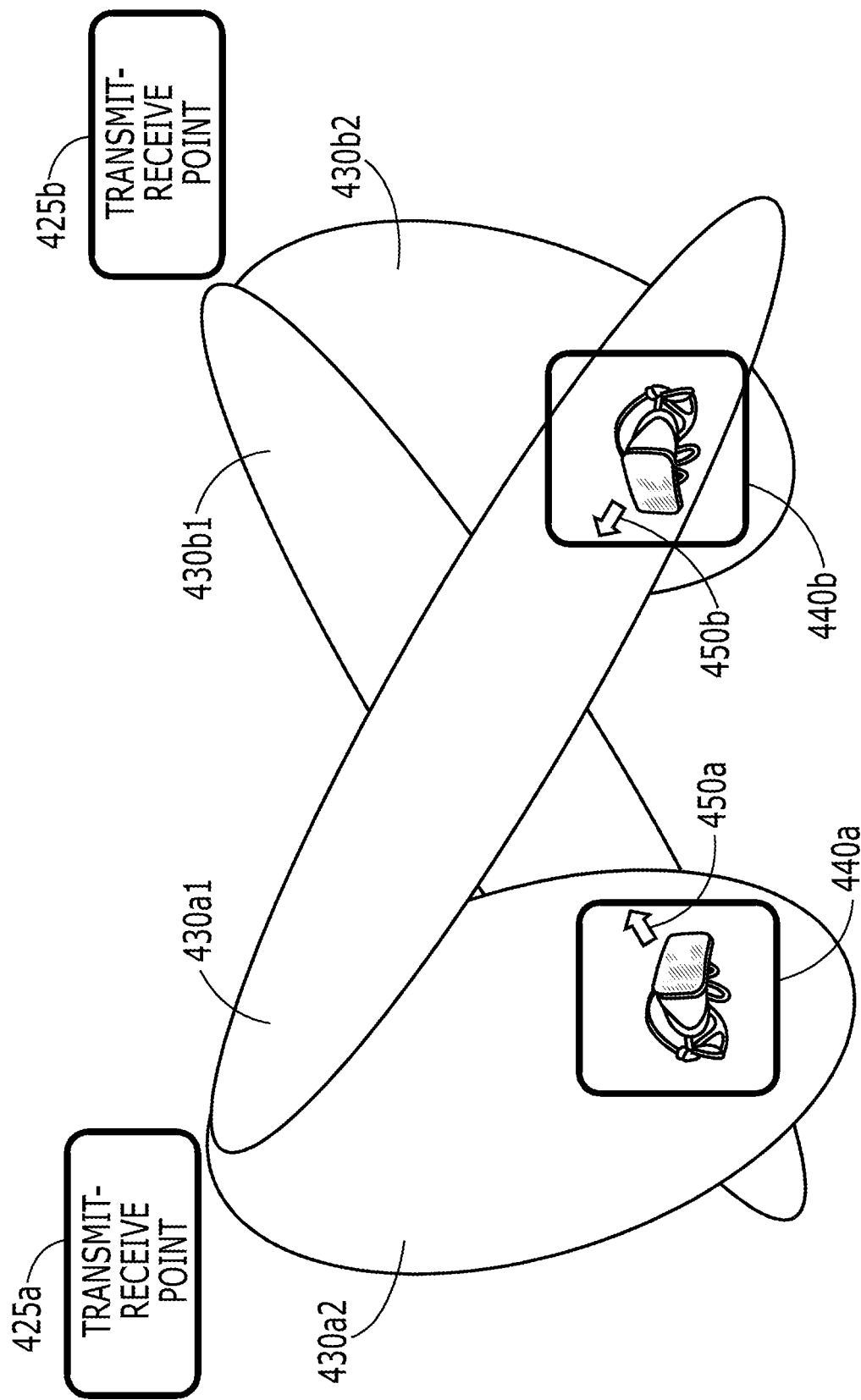
FIG. 4 illustrates an example related to estimation of a viewing direction based on received beams in accordance with at least some embodiments.

FIG. 4 illustrates an example related to estimation of a viewing direction based on received beams in accordance with at least some embodiments. The viewing direction may correspond to a direction to which the mobile device is directed to. FIG. 4 comprises first mobile device 440a and second mobile device 440b, which may be located within coverage areas of first TRP 425a and second TRP 425b. FIG. 4 also shows two beams 430a1 and 430a2 associated with TRP 425a, and two beams 430b1 and 430b2 associated with TRP 425b. Naturally, there may be more than two beams per TRP.

With reference to FIG. 1, mobile devices 440a and 440b may correspond to mobile devices 140 and beams 430a1, 430a2, 430b2 and 430b2 may correspond to beams 130. Also, 3D viewing spaces 450a and 450b, which demonstrate the direction to which the user is looking at, are shown in FIG. 4. Viewing directions 450a and 450b may correspond to tile 350a of 3D viewing space 350 of FIG. 3. Viewing directions 450a and 450b may also correspond to directions to which mobile devices 440a and 440b are directed to, respectively.

In the example of FIG. 4, tile 450a and 450b may be determined based on the received beams, for example, by comparing identities, IDs, of the beams of the received strongest beams, their TRP or cell IDs, and their angle-of-arrival with the corresponding mapping to the tiled content. In addition, the viewing directions may be determined based on locations of TRPs 425a and 425b. Mobile devices 440a and 440b may first estimate their locations and then select the appropriate sub-streams, i.e., tiles 450a and 450b. In general, use of a large set of candidate beams for estimating the directionality improves the accuracy of the estimation of the direction in which mobile device 440a is directed to.

The downlink transmission, comprising data such as media content, may be received by mobile device 440a using strongest beam 430b1, or set of beams, of TRP 425b, if the user of mobile device 440a is looking at the direction of TRP 425b, i.e., mobile device 440a is directed to TRP 425b. Similarly, mobile device 440b may receive media content using strongest beam 430a1, or set of beams, of TRP 425a, if the user of mobile device 440b is looking at the direction of TRP 425a.

If there are multiple TRPs, those may be transmitting the same data. Beams may be 3-dimensional, i.e., multiple beams may be sent in a direction within the horizontal axis while multiple beams may be sent in a direction within the vertical axis, wherein each beam has a length, and possibly a beam width.

Figure 5:
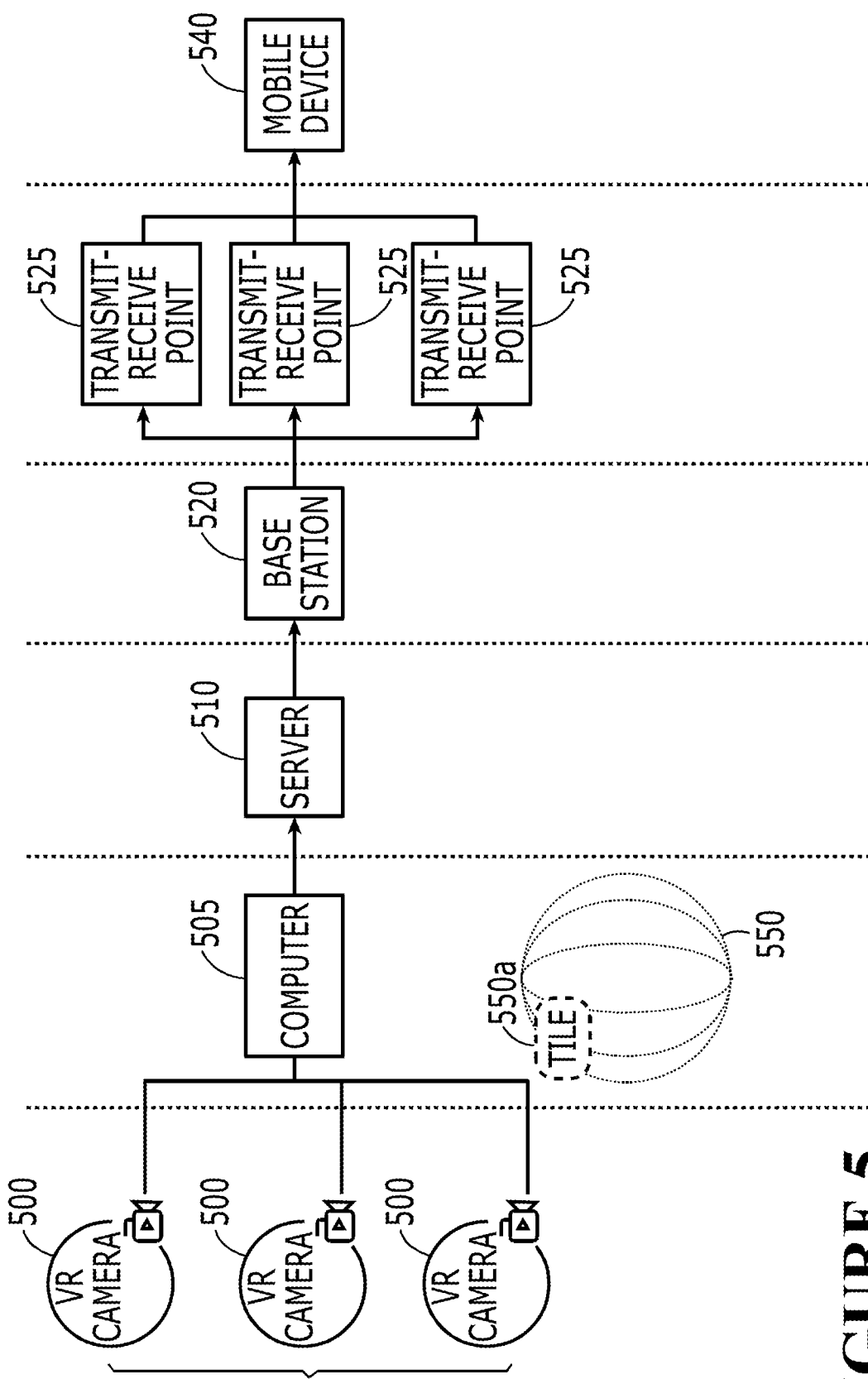
FIG. 5 illustrates an exemplary end-to-end implementation in accordance with at least some embodiments.

FIG. 5 illustrates an exemplary end-to-end implementation in accordance with at least some embodiments. For example, a live 360-degree VR video content may be distributed using the exemplary end-to-end implementation of FIG. 5. Cameras 500 may be VR cameras, which may record live content from different viewing directions. Each of cameras 500 may generate tile 550a of 360-degree media content individually. Tile 550a of the 360-degree directional media content may be sent to a computer 505, which may stitch the content received from multiple cameras 500 to generate overall 360-degree content 550. With reference to FIG. 3, overall 360-degree content 550 may correspond to 3D viewing space 350.

Moreover, computer 505 may encode overall 360-degree content 550, for example, using tile-based DASH encoding, wherein the 360-degree content 550 may be quantized into a set of tiles. Each tile 550a may represent a different viewing direction. In general, each tile 550a is associated with a sub-stream of transmission of overall 360-degree content 550. Overall 360-degree content 550 may be transferred to various mobile devices 540.

Computer 505 may transmit overall 360-degree content 550 to MEC or cloud server 510. MEC or cloud server may 510 may process overall 360-degree content 550 by adding location tags of TRPs 525 and/or direction tags of beams into the overall directional media content, which may be transmitted, i.e., broadcasted and/or multicasted. Direction tags may indicate the viewing direction associated with each tile 550a within overall 360-degree content 550 and each direction tag may be associated with one beam, to denote the direction of the beam in question. Moreover, direction tags may be combined with, e.g., beam information. MEC or cloud server may 510 may transmit overall 360-degree content 550 together with the location tags to a BS 520.

BS 500 may transmit the received information directly to mobile device 540 or via TRPs 525. Mobile device 540 may, based on the received transmission, determine information related to a received strongest beam, e.g., a direction of the strongest beam. Consequently, mobile device 540 may provide appropriate content to the mobile device using the direction of the strongest beam, which may correspond to the real-time viewing direction of the user. Said content may be displayed on the mobile device to the user via a user interface. As an example, live video content may be shown from the appropriate VR camera 500, which may be changed if the viewing direction of the user is changed, i.e., tile 550a may be changed. Changing the viewing direction of the user may change the strongest received beam as well.

Alternatively, or in addition, MEC or cloud server may 510 may transmit locations of TRPs 525 and directional properties, e.g., direction tags, of beams to BS 520. BS 520 may then transmit overall 360-degree content 550 over all the available beams to mobile device 540 directly, or via TRPs 525, along with the locations of TRPs 525 and the directional properties of beams to mobile device 540.

Mobile device 540 may thus receive the transmitted overall 360-degree content and estimate the real-time viewing direction of the user based on the directional properties of the strongest beams (candidate set) and the location of TRPs 525.

Thus, estimation of the viewing direction may be dependent on mobile device 540. Mobile device 540 may determine the real-time viewing direction of the user and show the appropriate tile 550a to the user. Said appropriate tile 550a may be associated with appropriate VR camera 500, which may reflect the real-time viewing direction of the user if they were at the location where the content is being generated, e.g., at a football stadium.

Same principles may be applied to any scenario where directional content is generated, encoded and transported to a user, for example, in a VR viewing arena or movie theater. The relationship between the received beams with the viewing direction may be estimated as shown in association with FIG. 4. An application in mobile device 540 may receive information related to the strongest beams received by mobile device 540, from the physical layer of mobile device 540, and based on this information estimate the viewing direction of the user. Consequently, mobile device 540 may show the appropriate tile 550a to the user.

In general, in some embodiments at least one strongest beam may be identified at a lower layer, e.g., a physical layer, of a mobile device using a Beam Reference Signal, BRS. Identifying the at least one strongest beam may comprise comparing the received powers of all the beams. BRS may occupy 8 subcarriers (5th~12th subcarrier) in every Resource Block, RB, except the 18 RBs at the center of the frequency band. The 18 RBs at the center may be reserved for Primary Synchronization Signals, PSS, Secondary Synchronization Signals, SSS and Extended Synchronization Signals, ESS. BRS may transmitted at every symbols (i.e., symbol 0~13) in subframes 0 and 25. The data may be based on pseudo random data, e.g., Gold Sequence.

The detected at least one strongest beam may be signaled from the physical layer to an application layer of mobile device 540. Alternatively, a VR or directional media content application that is running on mobile device 540 and showing the directional content, or selecting the content to be shown, to the user may frequently fetch this information in real-time from the physical layer, to keep track of the viewing direction of the user of mobile device 540. An overview of possible metadata may be signaled within a beam. Metadata may need to be extracted for detecting the candidate set of beams in the physical layer of the mobile device. In some embodiments, metadata may refer to a set of data that describes and gives information about other data. For example, PSS/SSS, ESS, BRS, etc., may be described as possible metadata, which makes it possible for the mobile device to detect the beam information. The candidate set of beams or their identities may be signaled to the Internet Protocol, IP, layer where the application may be located. The candidate set of beams, $S_{CB}$, may be calculated as: $S_{CB}$={Beam ID of f(NRB)}, where f(NRB) is a function that returns the N strongest received beam signals, in terms of reference signal received power, quality, etc. Thus, the mobile device may use the metadata to identify beams. Based on the calculation of $S_{CB}$ the mobile device may determine the strongest set of received beams, i.e., the candidate set of beams, which may be then used to estimate the viewing direction.

In some embodiments, a mapping of beams to tiles of 3D viewing space may be used. Such a mapping may be seen as a mapping of beams to all the possible viewing directions of the user, so that a combination of beams received from different transmitters corresponds to one possible viewing direction. The viewing directions may be quantized. As an example, if there are 100 possible combinations of beams, the number of possible viewing directions may be 100 as well. A first beam combination may correspond to a first possible viewing direction and a second beam combination may correspond to a second possible viewing direction, etc. That is to say, the first beam combination may correspond to a first tile and the second beam combination may correspond to a second tile. Such a mapping may be signaled by the application server to the application client in the mobile device as mapping instructions. The mapping instructions may be referred to as a mapping table in some embodiments. The mapping instructions may include the relationship between the beam combinations signaled by the physical layer of the mobile device and the tiles.

Figure 6:
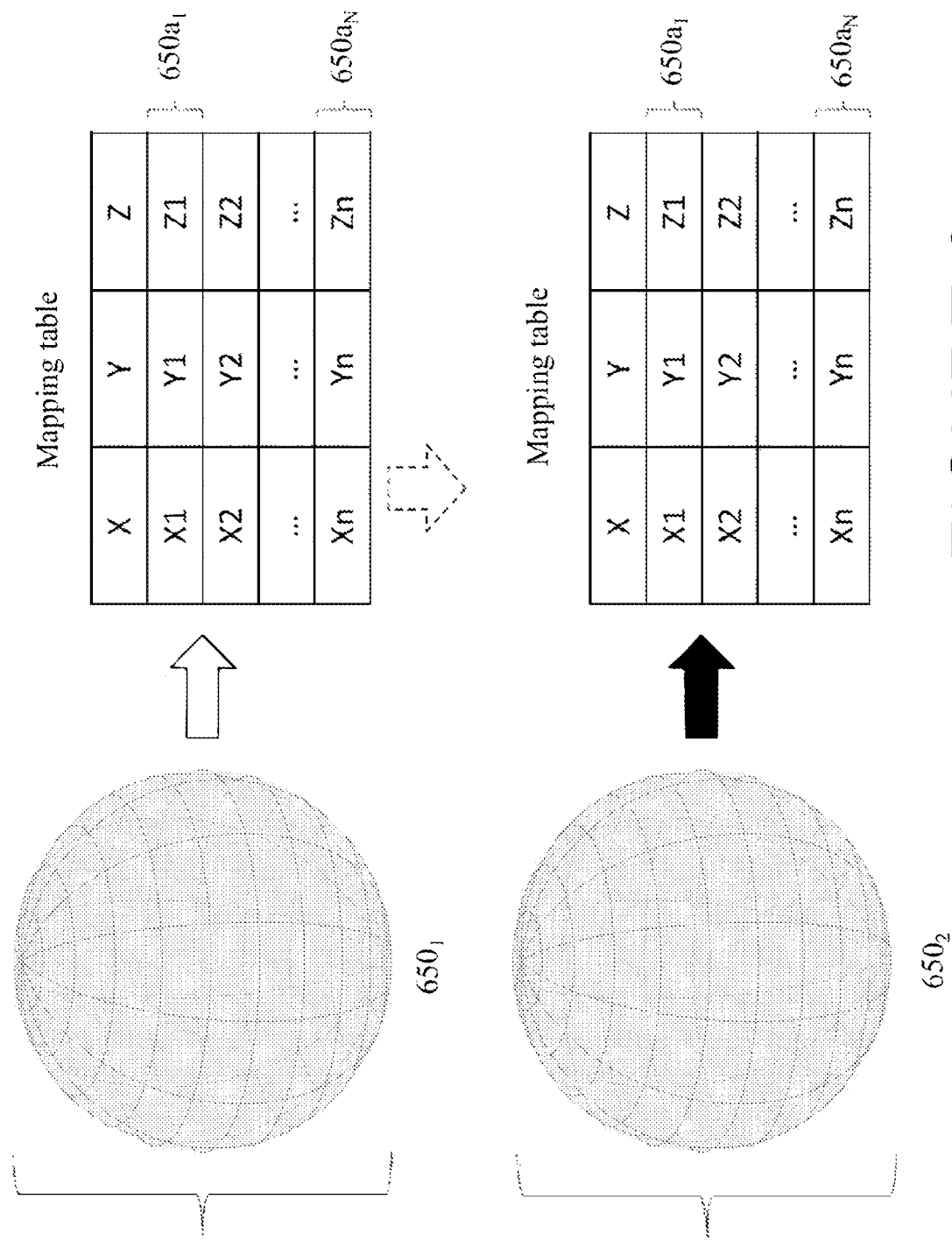
FIG. 6 illustrates a mapping in accordance with at least some embodiments.

Hence, the mobile device may receive mapping instructions from the network node, wherein the mapping instructions comprise mappings between beam combinations and tiles of the directional media content, select a part of the mapping instructions based on a combination of received beams and select the tile of the directional media content based on the selected part of the mapping instructions. FIG. 6 illustrates a mapping table in accordance with at least some embodiments. The mapping table, i.e., the mapping instructions, may be transmitted by a network, e.g., a BS, to a mobile device. The mapping table may be used for estimating a viewing direction of a user, i.e., a direction to which the mobile device is directed to. The mapping table may be handled at the physical layer of the mobile device. That is to say, the mobile device may receive the mapping table and use the mapping table to estimate the viewing direction of the user at the physical layer. The estimated viewing direction of the user may be provided to the application layer of the mobile device, from the physical layer of the mobile device, to be displayed on a display of the mobile device.

In FIG. 6, 3D viewing space $650_1$ corresponds to a viewing space for a first location of a first network node, e.g., a cell, TRP or a BS, and 3D viewing space $650_2$ corresponds to a viewing direction for a second location of a second network node. Hence, the mobile device may receive a set of candidate beams, e.g., a set of strongest beams {ax, by} which may comprise a first beam from the first network node {ax} or {ak} and a second beam {by} or {bl} from the second network node. The first beam and the second beam together may indicate a row to be selected from a mapping table, and each row may correspond to a certain viewing direction. Hence, a part of the mapping instructions may refer to a row in the mapping table.

Tile $650a_1$ corresponds to a first, quantized viewing direction {X1, Y1, Z1}, which may be mapped to candidate beams {ax, by}. Similarly, tile $650a_N$ corresponds to an Nth viewing direction {Xn, Yn, Zn}, which may be mapped to candidate beams {ak, bl}.

Based on the mapping table, the mobile device may hence estimate that a viewing direction of a user, i.e. a direction the mobile device is directed to in a 3D space, may be for example {X1, Y1, Z1} if beams {ax, by} are the strongest beams received from the first network and the second network node, respectively. The estimated viewing direction would enable the mobile device to show the appropriate media content to the user, e.g., tile $650a_1$, within the viewing space of the directional media content. Similarly, if beams {ak, bl} are the strongest beams received from the first network and the second network node, respectively, the mobile device may estimate that the viewing direction of the user corresponds to tile $650a_N$, i.e., {Xn, Yn, Zn}.

The mobile device may thus receive, from a network node, a mapping table. In the mapping table each row may comprise a mapping between one beam combination and one tile of the directional media content. The mobile device may select a row in the mapping table based on the estimated viewing direction of the user and also select the tile of the directional media content based on the selected row.

The mapping instructions may be also provided based on identities of the received strongest beams and their corresponding angles-of-arrival estimated by the mobile device. With reference to FIG. 6, this would imply mapping between beams {ax, by} with respective angles-of-arrival {Ak, Al}, which would be mapped to the viewing direction {X1, Y1, Z1}, i.e., tile $650a_1$. Instead of the viewing direction {X1, Y1, Z1} the mapping may be made directly to a tile within the directional content, e.g., tile $650a_1$ may be mapped directly to the received radio environment information. The received radio environment information may be in terms of identities of beams, angles-of-arrival, etc., and it may be mapped to a tile within the directional content.

The mobile device may thus select an appropriate tile and display the appropriate sub-stream on a display of the mobile device. It is noted that in some embodiments there is no information exchange between the mobile device and the network node does not have any information about the real-time viewing direction of the user, i.e., the direction to which the mobile device is directed to, and the network node does not adapt the beam directionality based on the viewing direction of the user. Based on the available received information, the mobile device may estimate the viewing direction and display the appropriate directional content. Similar mapping could be applied for the viewing space $650_2$, when the user is viewing directional content from a different location and source node, with a location-specific context.

Thus, a 3D viewing space may be formed of a finite set of quantized viewing directions. With reference to FIG. 3, one quantized viewing direction, e.g., $650a_1$, may correspond to one tile 350*a* of 3D viewing space 350. Based on the mapping instructions, the application within the mobile device may show directional content to the user, depending on the real-time viewing direction of the user which may be identified based on the received beams. The beams may be highly directional within the 3D space and BRS may be utilized to identify and segregate the received beams.

In some embodiments, the mapping instructions, defining the relationship between the beams and tiles of 3D viewing space, may be transmitted locally. Alternatively, locations of the TRPs and directions of the beams may be signaled to enable the mobile device to estimate the mapping as well.

Mobility may depend on the type of directional content viewed by the user and the application within the mobile device. For example, if the user is watching a movie, the real-time viewing direction within the viewing space may be relevant for a certain location of the mobile device. Such content may be referred to as static or location-independent directional media content, for which a simple mapping between the detected beams and the quantized viewing directions, i.e, tiles of the directional media content, would be sufficient. For example, a candidate set of beams may be changing depending on the movement of the mobile device, which needs to be covered using a larger number of TRPs in order to provide coverage within the entire region where the content is transmitted.

Embodiments may be used for dynamic or location-dependent directional content. The viewed content may not depend on the real-time viewing direction but also on the location of the mobile device, e.g., within a museum, exhibition centers or other scenarios. Different content may be shown to users to give them the full-virtual reality experience of being in the virtual world as the users move around within the physical space.

In some embodiments, different TRPs may transmit different directional content at different times. One transmission of the directional content may be relevant for a current location of the mobile device. Hence the content could keep changing as the user moves around, while still maintaining similar mapping, i.e., relationship between the beams and the viewing directions. Thus, the same beam identities may be reused while transmitting different content from different TRPs as the user is moving around, with each set of TRPs covering a finite region.

Alternatively, the mapping instructions may contain additional cell identity information indicating which location-specific content should be selected to show a specific tile to the user. Locations may be associated with cell identities, which may be determined by the physical layer of the mobile device and signaled to the application layer. A 3D viewing space for a first location may be associated with an identity of a first cell and a second location may be associated with an identity of a second cell of the transmitting first and second BSs, respectively. In the cell search procedure, the mobile device may obtain time and frequency synchronization with the cell and the cell identities from PSSs and SSS. The mapping instructions may therefore be cell-specific. Cell-specific mapping instructions enable location specificity, since a cell would have limited coverage area. Moreover, cell-specific mapping instructions may be advantageous especially in dynamic scenarios, wherein users may be moving around.

According to some embodiments, an application for showing the directional content to a user, e.g., for virtual or augmented reality, may be installed by the user on a mobile device. Alternatively, the application may be pre-installed on the mobile device. In some embodiments, the application of the mobile device may be provided by the network infrastructure owner provisioning the content.

The selection of the content may be based on the scenario as well. For example, if the user is watching the directional content at home, principles similar to video-on-demand may apply. On the other hand, if the user is watching the content at a movie theater, the application may be provided by the theater entity for starting to show content similar to linear content, wherein the content may be shown to users when the movie starts playing on mobile device. In this scenario, the content may be shown once the user enables the application, and the application may fetch the content from the stream transmitted over-the-air. In outdoor scenarios such as stadiums, the users may also select from a wide range of available directional content based on a live event ongoing on a stadium, with the directional view provided according to some embodiments.

The application may be installed by the user or pre-installed by an owner of an infrastructure, depending on the ownership of the mobile device. Also, content selection may be done by the user by fetching the content, similar to video-on-demand. Content selection may be limited to pre-decided ones, similar to linear content. In outdoor scenarios with mobility, content may be selected using a combination of linear and video-on-demand.

Some embodiments may provide simple and efficient implementation of directional/immersive content, by using the unique characteristics of beam-based transmissions. Significant cost reductions in the mobile device may be achieved due to the lack of need for special equipment. Significantly improved technology adoption is possible as well, since essentially any mobile device, e.g., 5G UE, may support reception and efficient display of directional/immersive content.

Figure 7:
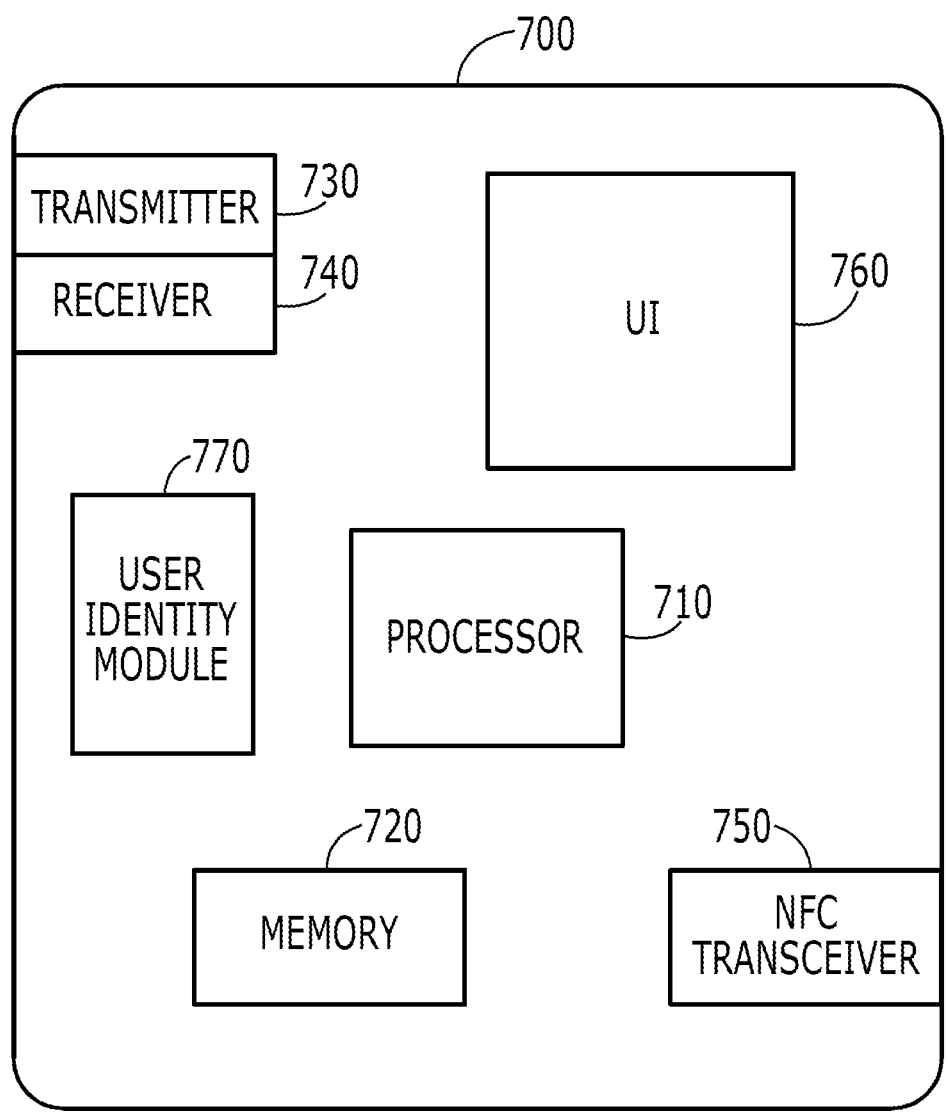
FIG. 7 illustrates an example apparatus capable of supporting at least some embodiments.

FIG. 7 illustrates an example apparatus capable of supporting at least some embodiments. Illustrated is device 700, which may comprise, for example, mobile device 140, e.g. an UE, or BS 120, such as, a network node of FIG. 1. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core produced by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise computer instructions that processor 710 is configured to execute. When computer instructions configured to cause processor 710 to perform certain actions are stored in memory 720, and device 700 overall is configured to run under the direction of processor 710 using computer instructions from memory 720, processor 710 and/or its at least one processing core may be considered to be configured to perform said certain actions. Memory 720 may be at least in part comprised in processor 710. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 700 may comprise a Near-Field Communication, NFC, transceiver 750. NFC transceiver 750 may support at least one NFC technology, such as Bluetooth, or similar technologies.

Device 700 may comprise User Interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a Subscriber Identity Module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver arranged to, for example, receive information via at least one electrical lead from receiver 740 for processing in processor 710. Alternatively to a serial bus, the receiver may comprise a parallel bus receiver.

Device 700 may comprise further devices not illustrated in FIG. 4. For example, where device 700 comprises a smartphone, it may comprise at least one digital camera. Some devices 700 may comprise a back-facing camera and a front-facing camera, wherein the back-facing camera may be intended for digital photography and the front-facing camera for video telephony. Device 700 may comprise a fingerprint or face sensor arranged to authenticate, at least in part, a user of device 700. In some embodiments, device 700 lacks at least one device described above. For example, some devices 700 may lack a NFC transceiver 750 and/or user identity module 770.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected without departing from the scope of the embodiments.

Figure 8:
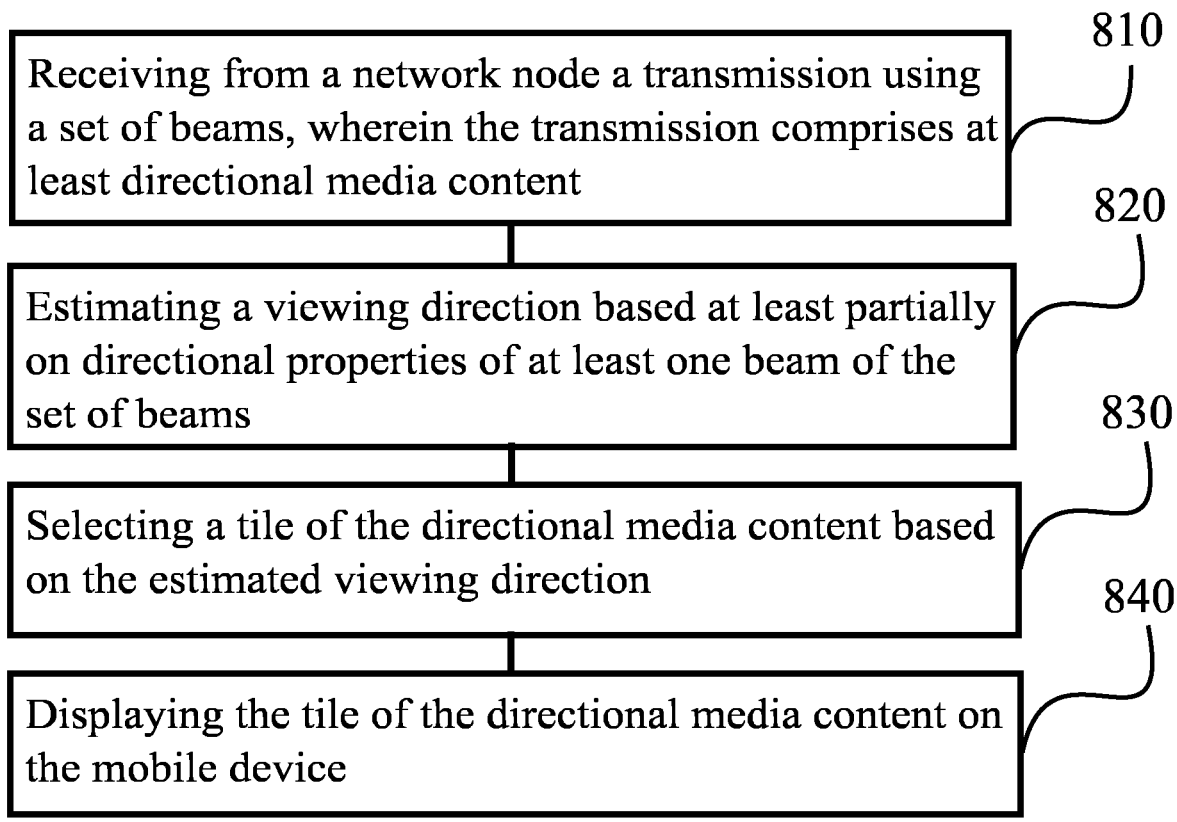
FIG. 8 illustrates a flow graph of a first method in accordance with at least some embodiments.

FIG. 8 is a flow graph of a first method in accordance with at least some embodiments. The phases of the illustrated first method may be performed by mobile device 140, such as, an UE, or by a control device configured to control the functioning thereof, possibly when installed therein.

The first method may comprise, at step 810, receiving from a network node a transmission using a set of beams, wherein the transmission comprises at least directional media content. The first method may also comprise, at step 820, estimating a viewing direction based at least partially on directional properties of at least one beam of the set of beams. In addition, the first method may comprise, at step 830, selecting a tile of the directional media content based on the estimated viewing direction. Finally, the first method may comprise displaying the tile of the directional media content on a mobile device.

Figure 9:
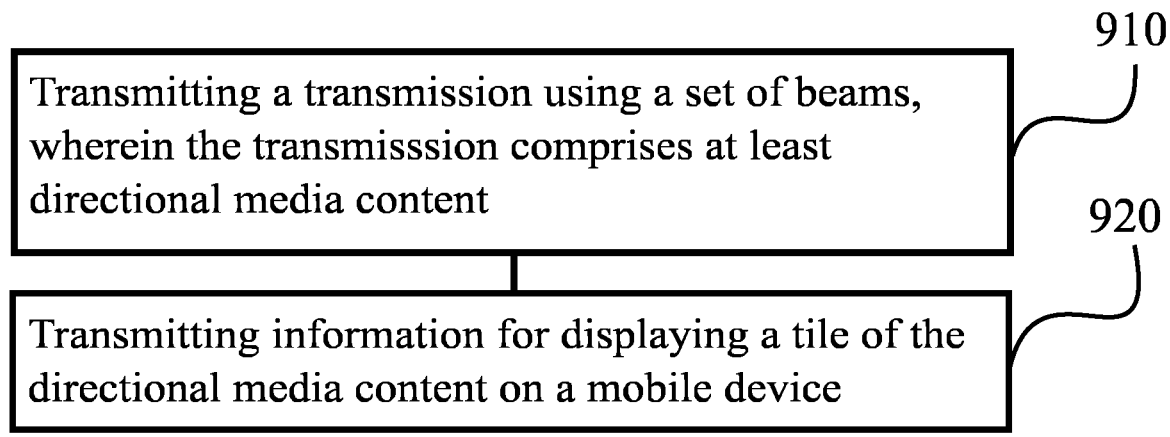
FIG. 9 illustrates a flow graph of a second method in accordance with at least some embodiments.

FIG. 9 is a flow graph of a second method in accordance with at least some embodiments. The phases of the illustrated second method may be performed by BS 120 or a network node in general, or by a control device configured to control the functioning thereof, possibly when installed therein.

The second method may comprise, at step 910, transmitting a transmission using a set of beams, wherein the transmission comprises at least directional media content. The second method may also comprise, at step 920, transmitting information for displaying a tile of the directional media content e.g. on a display of a mobile device.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, a terminal or a network node, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, a terminal or a network node, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in wireless communication networks, wherein video or directional media content is transmitted.

Acronyms List

3GPP 3rd Generation Partnership Project
AR Augmented Reality
BRS Beam Reference Signal
DANE DASH-aware network element
DASH Dynamic Adaptive Streaming over Hypertext Transfer Protocol
eMBB enhanced Mobile BroadBand
ESS Extended Synchronization Signal
GSM Global System for Mobile communication
HTTP Hypertext Transfer Protocol
IoT Internet of Things
IP Internet Protocol
LTE Long-Term Evolution
M2M Machine-to-Machine
MEC Multi-access Edge Computing
NFC Near-Field Communication
NR New Radio
PSS Primary Synchronization Signal
RAT Radio Access Technology
RB Resource Block
SFN Single-Frequency Network
SIM Subscriber Identity Module
SSS Secondary Synchronization Signal
TRP Transmit-Receive Point
UE User Equipment
UI User Interface
VR Virtual Reality
WCDMA Wideband Code Division Multiple Access
WiMAX Worldwide Interoperability for Microwave Access
WLAN Wireless Local Area Network

| REFERENCE SIGNS LIST | |
| --- | --- |
| 110, 210, 310, 510 | Server |
| 120, 220, 320, 520 | Base station |
| 130, 230, 430a1, 430a2, 430b1, 430b2 | Beams |
| 140, 240, 340, 440a, 440b, 540 | Mobile device |
| 150 | Core network |
| 225, 325, 425a, 425b, 525 | Transmit-Receive Point |
| 350, 550, 650 | 3D Viewing space |
| 350a, 450a, 450b, 550a, 650a | Tile of 3D viewing space |
| 500 | VR camera |
| 505 | Computer |
| 700-770 | Structure of the apparatus of FIG. 7 |
| 810-840 | Phases of the first method in FIG. 8 |
| 910-920 | Phases of the second method in FIG. 9 |

The invention claimed is:

1. An apparatus comprising at least one processing core, and at least one memory including computer program code, the at least one memory and the computer program code being configured to, with the at least one processing core, cause the apparatus at least to perform:
   receive from a network node a transmission using a set of beams, wherein the transmission comprises at least directional media content, wherein the directional media content is comprised of a plurality of tiles, and wherein a respective beam of the set of beams is associated with a respective tile of the plurality of tiles;
   estimate a viewing direction based on directional properties of at least one beam of the set of beams, wherein the directional properties comprise at least a direction tag associated with the at least one beam;
   select a tile of the plurality of tiles associated with the directional media content based on the estimated viewing direction; and
   display the tile of the directional media content on a mobile device.

2. The apparatus of claim 1, wherein the apparatus is caused further to perform:
   select at least one strongest beam from the set of beams; and
   select the tile of the directional media content based on the selected at least strongest one beam.

3. The apparatus of claim 1, wherein the apparatus is caused further to perform:
   select a set of strongest beams from the set of beams; and
   select the tile of the directional media content based on the selected set of strongest beams.

4. The apparatus of claim 1, wherein the apparatus is caused further to perform:
   receive information about the at least one beam, wherein said information comprises an identity of the at least one beam; and
   select the tile of the directional media content based on the identity of the at least one beam.

5. The apparatus of claim 1, wherein the apparatus is caused further to perform:
   receive mapping instructions from the network node, wherein the mapping instructions comprise mappings between beam combinations and tiles of the directional media content;
   select a part of the mapping instructions based on a combination of received beams; and
   select the tile of the directional media content based on the selected part of the mapping instructions.

6. The apparatus of claim 4, wherein the apparatus is caused further to perform:
   determine an angle of arrival of the at least one beam; and
   select the tile of the directional media content based on the angle of arrival of the at least one beam.

7. The apparatus of claim 6, wherein the apparatus is caused further to perform:
   determine the angle of arrival of the at least one beam based on the direction tag associated with the at least one beam and a location tag of the network node.

8. The apparatus of claim 7, wherein the apparatus is caused further to perform:
   receive information about a location of the network node;
   determine a direction of the at least one beam based on the location of the network node; and
   selecting the tile of the directional media content based on the direction of the at least one beam.

9. The apparatus of claim 1, wherein the apparatus is caused further to perform:
   render the tile of the directional media content for the user.

10. The apparatus of claim 8, wherein the apparatus is caused further to perform:
   signal information about at least one of the at least one beam or the estimated viewing direction of the user from a physical layer of the mobile device to an application layer; and
   select, at the application layer, the tile of the directional media content based on the signaled information.

11. The apparatus of claim 1, wherein the apparatus is caused further to perform:

receive information related to at least one or more of at least one stream of a set of streams or at least one program of a set of programs via the at least one beam;

select one of the at least one stream or the at least one program; and display the selected at least one stream or the selected at least one program on the display of the mobile device.

12. An apparatus comprising at least one processing core, and at least one memory including computer program code, the at least one memory and the computer program code being configured to, with the at least one processing core, cause the apparatus at least to perform:

transmit a transmission using a set of beams, wherein the transmission comprises at least directional media content, wherein the directional media content is comprised of a plurality of tiles, and wherein a respective beam of the set of beams is associated with a respective tile of the plurality of tiles; and transmit information for displaying a tile of the directional media content on a mobile device.

13. The apparatus of claim 12, wherein said information comprises information related to the set of beams.

14. The apparatus of claim 12, wherein said information comprises mapping instructions, and the mapping instructions comprise mappings between beam combinations and tiles of the directional media content.

15. The apparatus of claim 12, wherein said information comprises an identity of a beam.

16. The apparatus of claim 12, wherein said information comprises a location of the network node.

17. The apparatus of claim 13, wherein the set of the beams comprises beams in horizontal and vertical directions.

18. The apparatus of claim 12, wherein the apparatus is further caused to perform:

transmit information related to at least one or more of at least one stream of a set of streams or at least one program of a set of programs via each beam of the set of the beams.

19. The apparatus of claim 12, wherein the mapping instructions comprise a relationship between beam combinations signaled by a physical layer of the mobile device and the tiles.

20. A non-transitory computer readable medium having stored thereon a set of computer readable instructions that, when executed by at least one processor, cause an apparatus to at least perform:

transmitting a transmission using a set of beams, wherein the transmission comprises at least directional media content, wherein the directional media content is comprised of a plurality of tiles, and wherein a respective beam of the set of beams is associated with a respective tile of the plurality of tiles; and transmitting information for displaying a tile of the directional media content on a mobile device.

* * * * *